United States Patent
Murphy et al.

(10) Patent No.: US 7,484,256 B2
(45) Date of Patent: *Feb. 3, 2009

(54) FIRE RETARDANT COVER FOR MATTRESSES

(75) Inventors: Harrison R. Murphy, Great Falls, VA (US); Juraj Michal Daniel Slavik, II, McLean, VA (US); Ronald Sytz, Gastonia, NC (US)

(73) Assignee: Murtzco, LLC, Great Falls, VA (US)

(*) Notice: Subject to any disclaimer, the term of this patent is extended or adjusted under 35 U.S.C. 154(b) by 241 days.

This patent is subject to a terminal disclaimer.

(21) Appl. No.: 11/258,752

(22) Filed: Oct. 26, 2005

(65) Prior Publication Data

US 2006/0135014 A1    Jun. 22, 2006

Related U.S. Application Data

(63) Continuation-in-part of application No. 11/208,966, filed on Aug. 22, 2005.

(30) Foreign Application Priority Data

Nov. 26, 2004    (GB) .................................. 0426076.6

(51) Int. Cl.
| | |
|---|---|
| *A47C 5/12* | (2006.01) |
| *D04B 1/22* | (2006.01) |
| *D04B 1/14* | (2006.01) |
| *D04B 7/24* | (2006.01) |
| *D04B 21/20* | (2006.01) |

(52) U.S. Cl. ........................... 5/698; 442/312; 428/920; 428/921

(58) Field of Classification Search ..................... 5/483, 5/698; 428/920, 921; 442/304, 312
See application file for complete search history.

(56) References Cited

U.S. PATENT DOCUMENTS

| | | | |
|---|---|---|---|
| 4,092,752 A | | 6/1978 | Dougan |
| 4,120,798 A | * | 10/1978 | Mischutin .................... 252/604 |
| 4,348,306 A | * | 9/1982 | Mischutin .................... 252/608 |
| 4,504,991 A | | 3/1985 | Klancnik |
| 4,623,583 A | * | 11/1986 | Mischutin .................... 442/146 |
| 5,578,368 A | | 11/1996 | Forsten et al. |
| 6,146,759 A | | 11/2000 | Land |
| 6,410,140 B1 | | 6/2002 | Land et al. |
| 6,718,583 B1 | * | 4/2004 | Diaz .............................. 5/698 |

(Continued)

FOREIGN PATENT DOCUMENTS

WO    WO 03-023108    3/2003

*Primary Examiner*—Patricia Engle
*Assistant Examiner*—Gilbert Lee
(74) *Attorney, Agent, or Firm*—Triangle Patents, PLLC (57) ABSTRACT

A retrofit cover for fully or partially enclosing a mattress, wherein the cover is formed of a unitary, integrally formed fabric having a fire barrier element. The cover is capable of rendering mattresses, mattress foundations, upholstered furniture article and other articles filled with resilient cushioning materials that were not originally manufactured to meet a full-scale open flame standard capable of passing such newly mandated standard for performance in newly manufactured items. When tested in accordance with the flame resistance test protocols of 16 CFR 1633 or TB 603, the item encased in the retrofit cover has a maximum heat release rate of less than 200 kW and a total energy release of less than 25 MJ in the first five minutes of the test.

38 Claims, 4 Drawing Sheets

U.S. PATENT DOCUMENTS

| | | |
|---|---|---|
| 6,823,548 B2 | 11/2004 | Murphy et al. |
| 2004/0060119 A1 * | 4/2004 | Murphy et al. ................ 5/698 |
| 2004/0060120 A1 | 4/2004 | Murphy et al. |
| 2004/0062912 A1 | 4/2004 | Mason et al. |
| 2004/0097156 A1 | 5/2004 | McGuire et al. |
| 2004/0102112 A1 | 5/2004 | McGuire et al. |
| 2004/0106347 A1 | 6/2004 | McGuire et al. |
| 2004/0139552 A1 | 7/2004 | Walters et al. |
| 2005/0026528 A1 | 2/2005 | Forsten et al. |
| 2005/0097652 A1 | 5/2005 | Rock et al. |
| 2005/0115001 A1 | 6/2005 | Horst |
| 2006/0090272 A1 | 5/2006 | Mio et al. |
| 2007/0004302 A1 | 1/2007 | McKinnon et al. |

* cited by examiner

FIRE RETARDANT COVER FOR MATTRESSES

RELATIONSHIP TO CO-PENDING APPLICATIONS

The present invention is related to one or more co-pending applications: it is a continuation-in-part of U.S. patent application Ser. No. 11/208,966 filed Aug. 22, 2005, which is incorporated herein by reference in its entirety.

TECHNICAL FIELD

The invention relates to open flame resistant mattresses, mattress foundations, upholstered furniture article and other articles filled with resilient cushioning materials that are rendered resistant to open flame and smoldering ignition sources by a consumer/end-user installed, after market, retrofit cover comprising a knitted textile material comprising inherently flame retardant fibers and materials capable of being manufactured with decorative elements that includes an integrated fire barrier element. The knitted textile material with integrated fire barrier may either partially or fully enclose the mattress, mattress foundation, upholstered furniture article or other article filled with resilient cushioning material.

BACKGROUND OF THE INVENTION

The number of injuries and fatalities associated with residential fires in which a mattress, furniture article or other filled item was the first item ignited or where these products exacerbated the fire event has led to regulatory efforts to reduce flammability of mattresses, upholstered furniture and bedclothes used in homes and other occupancies.

The passage of Assembly Bill 603 in the California Legislature of Assembly required that all mattresses and sleep surfaces sold in the State of California since Jan. 1, 2005, meet an open flame resistance standard described in the state's Technical Bulletin #603 (TB #603). Regulation and enforcement of TB #603 have fallen to the state's Bureau of Home Furnishings and Thermal Insulation (BHFTI).

In addition, the United States Consumer Products Safety Commission (CPSC) is currently in the rule-making phase of developing new regulations for further reducing mattress flammability beyond the level required by the Cigarette Ignition Standards as codified in Part 1632 of the Code of Federal Regulations 16 (16 CFR 1632) (or formerly FF 4-72) since the 1970's. This was announced in the Federal Register Notice of Public Rule Making (NPR) published Jan. 13, 2005 (Volume 70, Number 9 Page 2470) and is proposed as 16 CFR 1633, which is incorporated herein by reference in its entirety.

Additionally, the CPSC is engaged in evaluation of a bedclothes flammability standard as an adjunct to its mattress flammability work. This work has been announced in the Federal Register Advance Notice of Public Rule Making (ANPR) published Jan. 13, 2005 (Volume 70, Number 9 Page 2514) and is proposed as 16 CFR 1634. It is to be noted however that this designation may change as the same 16 CFR 1634 designation is cited in the CPSC Staff Draft Standard for Upholstered Furniture Flammability published in May 2005.

The topic of "bedclothes flammability" is also under scrutiny by the State of California under the BHFTI Technical Bulletin #604 which is presently in draft form as published on Oct. 1, 2004, and pending final comment, revision, approval and enactment into law as of July 2005, which is incorporated herein by reference in its entirety.

The CPSC and the BHFTI have both been engaged in the process of evaluating improved degrees of furniture flammability performance. The BHFTI efforts are embodied in efforts to revise the testing requirements found in California Technical Bulletin #117. The present CPSC efforts actually initially commenced in 1994 with the publication of an Advanced Notice of Public Rulemaking (ANPR) to initiate regulatory proceedings under the Federal Flammable Fabrics Act (FFA) covering the principal fire risks to upholstered furniture: ignition by smoldering cigarettes and ignition by small open flame sources (e.g., lighters, matches and candles). In May 2005, the CPSC published a Staff Draft Standard for Upholstered Furniture Flammability Numerous international and maritime standards also exist for the evaluation of mattresses, bedding sets, upholstered furniture and filled articles. Among these are BS (British Standard) 5852 Part 1, BS 5852 Part 2, BS 5852: 1990 Section 4, BS 5852: 1990 Section 5, BS 6807:1986, BS 7176, BS EN 1021-1, BS EN 1021-2, BS EN 597-1, BS EN 597-2, BS 7175, BS EN ISO 12952: Parts 1-4, International Maritime Organisation Method (IMO) A 652 (16) for upholstered furniture, and IMO A 652 (17) for bedding, as well as their material equivalents that have been adopted by various countries throughout the world.

The new standards for flammability of residential mattresses, upholstered furniture and bedding articles embodied in TB #603, TB #604, the revisions to TB #117, the 16 CFR 1633 proposal and the CPSC draft language on furniture have added to the realm of flammability testing previously available for the design of products targeted for institutional applications. Institutional settings, such as healthcare, dormitory and corrections, have used California Technical Bulletin #121, California Technical Bulletin #129, Boston Fire Department IX-11, ASTM E-1590, Underwriters Laboratory (UL) 1895, and National Fire Protection Association (NFPA) 267, to assess performance of full-scale composite mattresses and mattress foundations against open flame ignition sources, California Technical Bulletin 133, ASTM E-1537 and NFPA 266, to assess performance of full-scale composite furniture items and mock-ups against open flame ignition sources, and NFPA 701, California Technical Bulletin #117, NFPA 260, NFPA 261, 16 CFR 1632, and UL 1975 to assess small scale performance of component materials used in mattresses, furniture and filled articles against small open flames and smoldering cigarette ignition sources.

Institutional bedding installations typically require only a mattress and no foundation. Such mattresses may be simply a solid core of polyurethane foam, latex foam or other foam composition, which may be combustion modified to some degree as well. Many of the components used in institutional mattresses and sleep support surfaces, including fill materials and covering fabrics are subject to performance testing according to test criteria such as NFPA 701 and California Technical Bulletin No. 117.

Such requirements for full scale, open flame resistant performance in mattresses, mattress foundations, bedclothes and other similarly filled articles comprising resilient cushioning materials have created new demands for performance oriented fire barrier textiles and related materials.

One approach to reducing flammability of mattresses, mattress foundations, upholstered furniture and other filled articles, such as bedclothes, has been to treat fabrics used in their construction with chemical flame retardants. However, these chemical treatments may be objectionable because of distasteful odors which are noticeable when in close contact with the materials, off-gassing obnoxious elements, stiffness of the fabric caused by such treatments, which may compromise the comfort of the finished mattress or mattress foundation, and the potential temporary durability of such treatments, which may compromise the long term protection from open-flame, smoldering ignition and radiant/thermal heat flux sources. Additional objectionable traits of such topically applied chemistries may be consumer backlash and rejection of such treatments, out of concern for the toxic effects of such treatments on human health, as evidenced by the public reaction and subsequent regulatory control to findings of the flame retardant PBDE in human tissue and breast milk, and the potential adverse effects on the environment as the chemistries progress through the product life cycle from manufacturing through use and ultimate disposal.

The use of inherent flame retardant fibers in the design of fire barrier and thermal insulation textiles and related materials has shown to be both effective in terms of performance and preferable in terms of the marketing attributes associated with them. The following fibers have been found to be particularly useful in such applications: aramids, including para-aramids (poly(p-phenylene terephthalamide), e.g., KEVLAR® (Dupont Corporation) and TWARON® (Teijin Twaron BV) and meta-aramids (poly(m-phenylene isophthalamide), such as Nomex® (Dupont Corporation) and Conex® (Teijin Twaron BV); fiberglass; melamines such as BASOFIL® (BASF/Mckinnon-Land-Moran, LLC); polybenzimidazole (PBI) (Celanese Acetate A.G); oxidized polyacrylonitrile (PAN); novoloids, such as KYNOL® (American Kynol, Inc); pre-oxidized fibers and carbon fibers, modacrylics, such as, e.g., KANECERON® and PROTEX® (Kaneka), SEF (Solutia) and LUFNEN® (Kanebo Goshen), FR (fire- or flame-resisting, -resistant, -retarding or -retardant) rayon, FR viscose, such as, e.g., VISIL® (Sateri Oy) and LENZING FR® (Lenzing AG, Fibers Division), and wool. It should be noted that these fibers are merely exemplary, and other fire-retardant fibers that integrate their performance during polymerization of the fibers, including fibers that are developed in the future may be used.

The use of flame retardant fibers that have achieved such performance through chemical treatment that is topically applied to the fibers prior to formation into textile articles, are specifically excluded from embodiments contemplated by the present invention. These treatments to fibers or fabrics may be non-durable or durable in nature. Typical non durable finishes include, mono and diammonium phosphate, ammonium bromide, ammonium chloride, boric acid, borax, ammonium borate, ethanolammonium borate, phosphate or sulfamate, ammonium sulfamate, organic phosphate esters, halogenated organic compounds. Durable finishes may include, halogenated organic compounds like decabromodiphenyl oxide, chlorinated or brominated paraffin, chlorinated or brominated binders, thiourea, hydrated alumina, graphite, antimony oxides, and the like. These chemical treatments may be applied to organic fibers, such as cotton, kenaf, ramie, hemp, flax, or jute, or to known synthetic fibers, such as nylon, polyester, rayon or the like.

The retrofit cover described by the present invention may also incorporate other performance enhancing or finishing elements, such as treatments or preparations that are anti-microbial, anti-fungal, anti-acaral, or anti-bacterial in nature. Other finishing chemistries like antistatic, dyestuffs, water and oil repellents, surfactants, and other treatments are also contemplated by the present invention. Such auxiliary finishing treatments may be omitted and the knitted fabric with fire barrier properties may simply be used in its natural, greige state without detriment to the desired fire resistant performance.

According to the International Sleep Products Association (ISPA) the domestic US mattress industry shipped mattresses and foundation units in 2004 totaling 41,175,600 pieces or roughly 20,587,800 sets of bedding. In the preceding 10 years for which they tracked this data, the total is 365,508,500 pieces and for the preceding 15 years for which they tracked this data, the total is 522,104,100 pieces. These represent an installed base of between approximately 182,500,000 and 261,052,050 sets of bedding prior to purchases in 2004 based on the expected service life of the bedding prior to replacement to be between 10 and 15 years.

The benefits of improved flammability design in newly manufactured mattresses and mattress foundations mandated by regulatory efforts such as California Assembly Bill #603 and the CPSC work under 16 CFR 1633, will likely require more than a decade of sales to accrue the expected benefits of reduced exposure to fire risks.

It is reasonable to expect that the life cycles of upholstered furniture items will result in similar time frame to accrue to benefits of improved flammability design in newly manufactured upholstered furniture items once regulatory activity governing these items is concluded.

While the life cycle for articles filled with resilient cushioning materials, such as mattress pads, comforters, pillows and the like is not predicted to be as long as for mattresses, mattress foundations and upholstered furniture articles, the expected benefits to be accrued by regulatory efforts governing these items will also likely take as many as ten years to fully penetrate consumer use through replacement of the installed base of products that predate the effective date of such regulation.

It reasonable to expect that as Federally mandated performance standards are enacted to govern response of such articles to ignition sources, there will be increasing consumer awareness of the potential disparity in performance between products in their homes manufactured prior to the newly mandated performance requirements and the newly introduced product offerings. Further, it is also reasonable to expect many consumers (especially those who have made more recent purchases of such articles and where the condition of such articles does not yet dictate replacement) will seek out solutions to address the disparity in fire resistant performance through refitting or modifying their existing possessions.

Substantially present in the field of mattress marketing is the premium placed on the aesthetic designs of the traditional mattress tickings. Industry research estimates are that females play the role of primary decision makers in 80% of sales of mattresses and foundations. Tickings have anecdotally been designed to replicate the appearance of a "wedding dress" to appeal to these buyers. In some cases the patterns or designs are printed onto fabrics used as the exterior ticking material. Damask fabrics typically used for mattress tickings have routinely knitted or woven texture or patterns into the material. These patterns and textures lend design elements that consumers value in the purchase process.

There have been efforts to address the flammability risk of mattresses, mattress foundations, upholstered furniture articles and articles filled with resilient cushioning materials, but these efforts have been universally targeted at the new construction of the composite items that are covered under regulatory efforts and these works do not show evidence of contemplating the benefits to the "installed user base" of the present invention.

For example, U.S. Pat. No. 4,504,991, to Klancnik, Mar. 19, 1985, describes an improved mattress includes a composite made of a layer of a fire retardant material capable of providing a heat barrier bonded to a layer of high tensile strength material, such as fiberglass fabric.

U.S. Pat. No. 5,578,368, to Forsten, Nov. 26, 1996, discusses a fire-resistant material used in items such as sleeping bags, comforters, wearing apparel, upholstered furniture and mattress tops comprises a fiberfill batt and a layer of a fire-resistant aramid fiber contacting at least one side of the aramid fiber layer.

U.S. Pat. No. 4,092,752, to Dougan, Jun. 6, 1978, discusses an improved combination of box spring and mattress is provided. The mattress has a core of a particular class of flame-retarded flexible polyurethane foam and, optionally, has an outer layer of flexible polyimide foam fabricated to surround said core. The foam core, optionally with outer layer of polyimide foam, is enclosed in a flame retardant or retarded ticking (flame retarded cotton, polyvinyl chloride, fiber glass cloth, high temperature resistant polymeric fiber cloth). The box spring has a non-combustible frame and, optionally, is padded with a flame retarded flexible polyurethane foam, such as that used in the aforesaid mattress, or a flexible polyimide foam.

U.S. Pat. Nos. 6,146,759 and 6,410,140, to Land, Nov. 14, 2000 and Jun. 25, 2002 respectively, discussed a fire resistant corespun yarn. The yarn includes a core of a high temperature resistant continuous filament comprising fiberglass and a low temperature synthetic continuous filament selected from nylon, polyester, polyethylene and polyolefin, the core being two-plied. This yarn may be woven and knit in fine, non-plied or plied form and extends the range of fineness of fabrics below heretofore achievable limits. Also provided is a fire resistant fabric which includes a fire resistant fabric substrate formed from the fire resistant corespun yarn, as well as a product upholstered with the fire resistant fabric.

Numerous other examples of innovative design approaches to fire barrier design for mattresses and mattress foundations have recently been offered, including the following
    a. Mason and Hale-Blackstone (20040062912) (Ser. No. 10/262,133) filed Oct. 1, 2002
    b. McGuire and Taylor
        i. (20040097156)(Ser. No. 10/298,990) filed Nov. 18, 2002
        ii. (20040102112)(Ser. No. 10/714,370) filed Nov. 14, 2003
        iii. (20040106347)(Ser. No. 10/714,132) filed Nov. 14, 2003
    c. Mater and Handermann (PCT WO 03-023108) filed Sep. 11, 2002
    d. Murphy and Slavik
        i. U.S. Pat. No. 6,823,548, issued Nov. 30, 2004
        ii. (20040060120)(Ser. No. 10/661,292) filed Sep. 12, 2003

All of these works provide for the creation of fire barrier fabrics designed to protect mattresses and upholstered furniture from open flame ignition sources, yet they universally indicate that the barriers are part of the original manufacture of the composite articles and they do not contemplate use of the barriers to create an "after-market", retrofit cover that can be installed by the consumer. Furthermore, none of them disclose the use of a double knit textile as disclosed by the present invention.

US Application 20040139552 (Ser. No. 10/702,358) filed Nov. 6, 2003, to Walters, et al, discloses a removable mattress cover assembly that includes a removable mattress cover that attaches to an upright wall assembly. The upright wall assembly includes an upright wall that attaches to a top of a mattress base and one or more wall fasteners attached at or near the top of the upright wall. The removable mattress cover includes cover fasteners that mate with respective wall fasteners to attach the cover to the upright wall. When the cover fasteners are attached to the wall fasteners, the removable mattress cover lays over the top of the mattress base, and the upright wall is nearly perpendicular to the removable mattress cover. This allows a fill material that is nearly the same size as the top of the mattress to be inserted beneath the removable mattress cover. The fasteners can project upwardly, away from the top of the mattress base, making the fasteners easily accessible from above.

US Application 20050097652 (Ser. No. 11/001,893) filed Dec. 1, 2004, to Rock, et al, discloses a composite velour fabric garment includes a laminate consisting of an outer woven shell layer, an inner thermal layer of knit construction, and an intermediate layer disposed between and laminated to each of the shell layer and the thermal layer.

US Application 20050115001 (Ser. No. 10/997,933) filed Nov. 29, 2004, to Horst, describes a bedding article which includes a core and a flame-resistant protective cover surrounding and enclosing the core.

However, none of these solutions is capable of delivering the complete scope of consumer desirable features and performance benefits contemplated by the present invention. The user-installable nature of the retrofit design will extend performance benefits to the preponderance of installed mattresses and other filled articles in service prior to adoption of new regulatory mandates. The preferred selection of inherent fibers mirrors the growing trend toward more environmentally conscious materials and away from increased presence of chemical treatments. The ability to incorporate decorative elements into the fabric design will add to the appeal to consumers. The fact that the retrofit cover installs over the complete existing design of the mattress or other similarly filled article and does not require the removal of any material from the existing article by the consumer or end-user requires that it posses the enhanced protective capabilities to protect the filling materials from ignition as well as the existing covering materials.

SUMMARY OF THE INVENTION

It has been unexpectedly discovered that a retrofit cover assembly that can be installed by consumers, composed of a flame retardant fire barrier textile comprising inherently flame retardant fiber and material, can dramatically reduce flammability of a mattress, mattress foundation, upholstered furniture article or article filled with resilient filling material, constructed therewith such a mattress, mattress foundation, upholstered furniture article or article filled with resilient filling material that is covered or partially covered with the cover (and no material is required to be removed from the existing item) so that the composite article can meet the stringent new standards for flammability of mattresses and mattress sets for the residential market set by proposed 16 CFR 1633, its equivalents or flammability tests for upholstered furniture or filled bedding articles.

It is an aspect of the present invention to provide mattress covers for existing mattresses and foundations such that their filling materials are covered or partially covered such that the composite article is flame resistant and/or flame retardant.

These and other aspects of the present invention will become apparent to those skilled in the art after a reading of the following description of the preferred embodiment when considered with the drawings.

DETAILED DESCRIPTION OF THE INVENTION

In the following description, like reference characters designate like or corresponding parts throughout the several views. Also in the following description, it is to be understood that such terms as "forward," "rearward," "front," "back," "right," "left," "upwardly," "downwardly," and the like are words of convenience and are not to be construed as limiting terms.

Figure 1:
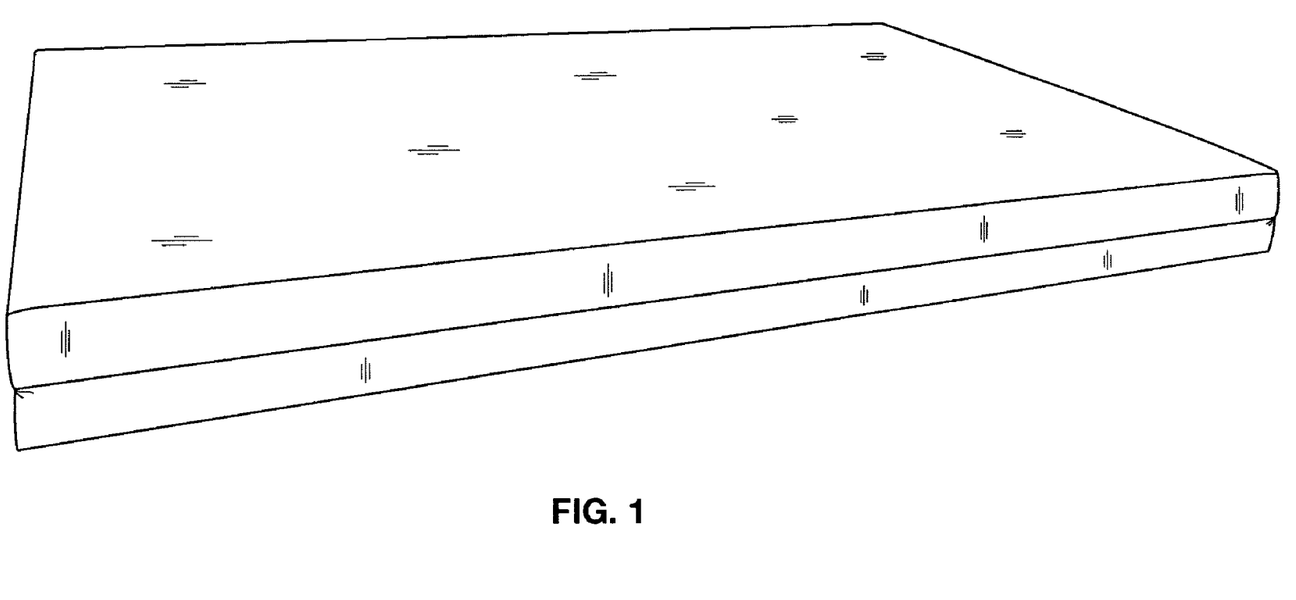
FIG. 1 shows a mattress fire barrier cover design installed on a mattress.
Figure 2:
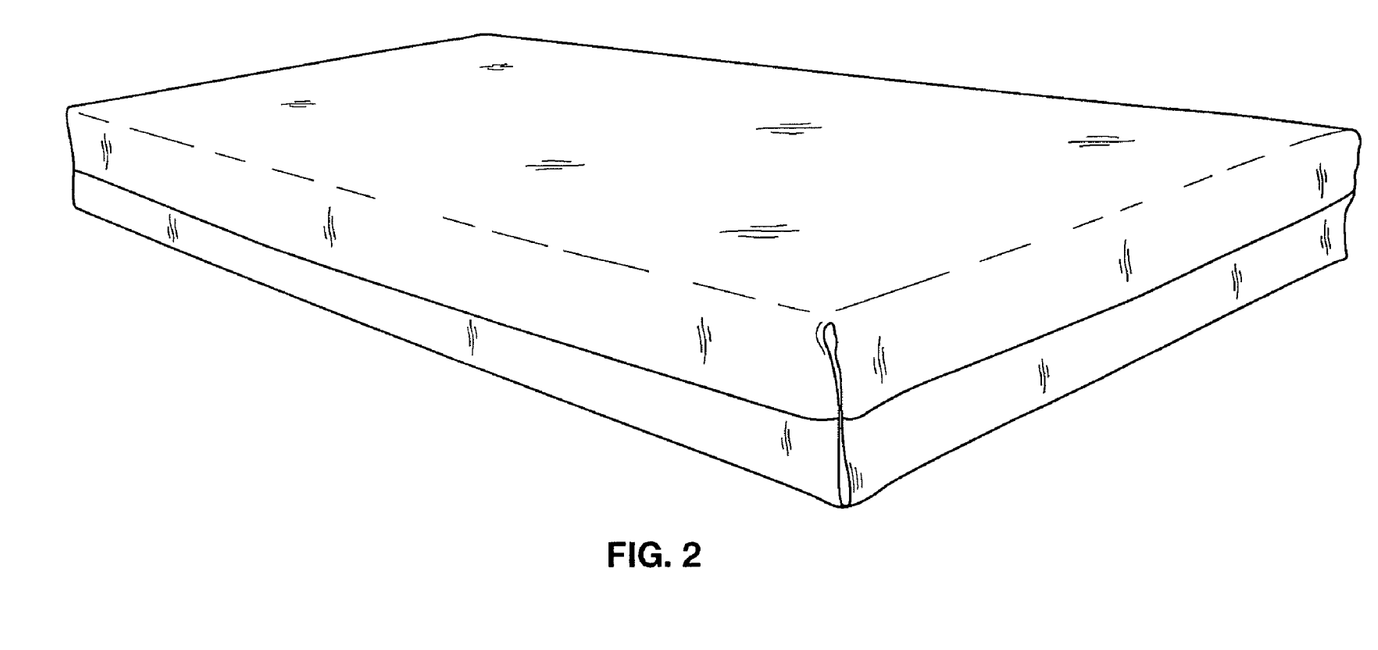
FIG. 2 shows another embodiment of a mattress fire barrier cover design installed on core of mattress.

Referring now to the drawings in general, the illustrations are for the purpose of describing a preferred embodiment of the invention and are not intended to limit the invention thereto. As best seen in FIGS. 1 and 2, a unitary, integrally formed fire barrier fabric is shown. The present invention provides a cover including an integral, unitarily formed fabric having a fire barrier integrated therewith for covering to fully or partially enclose a mattress or mattress foundation for providing fire retardance or fire resistance (FR) therefore without requiring any additional treatments for the fabric. Preferably, the FR cover is retrofittable such that it may be applied to the mattress or mattress foundation to a fully manufactured mattress or mattress foundation.

Figure 3:
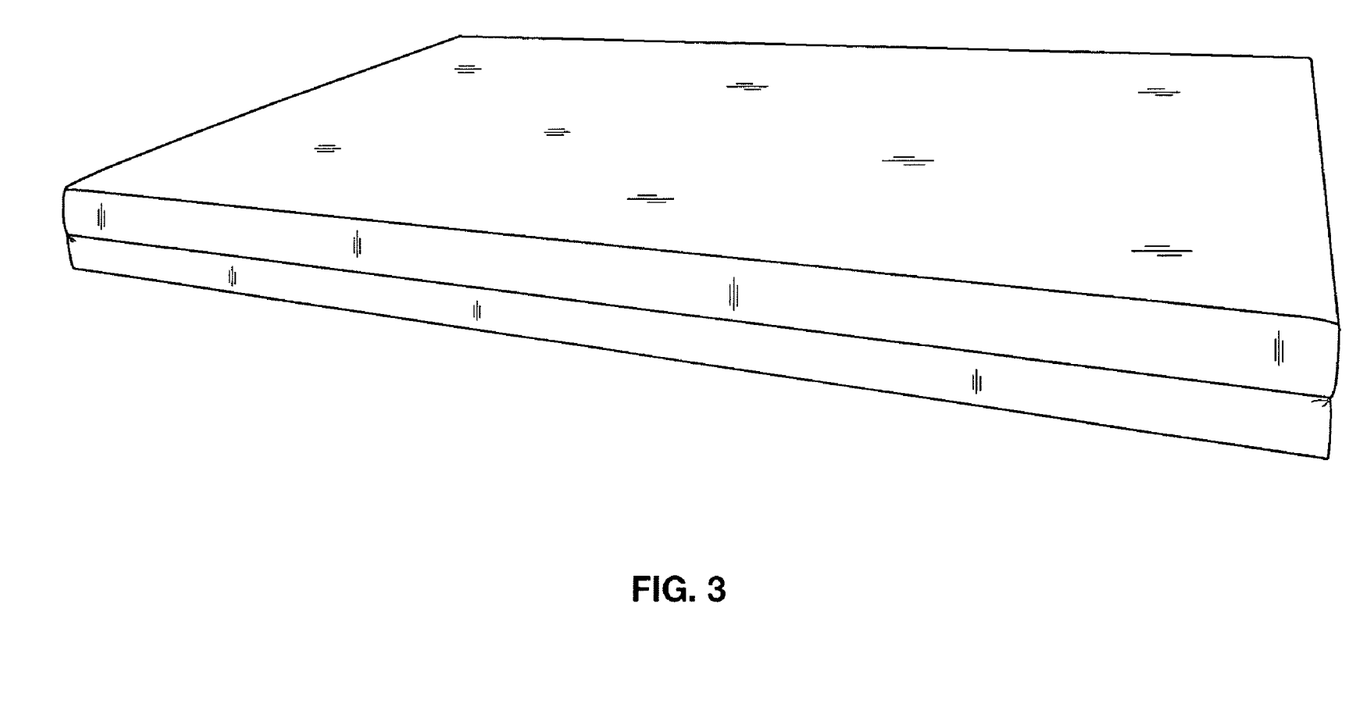
FIG. 3 shows another mattress fire barrier cover design installed on a mattress.
Figure 4:
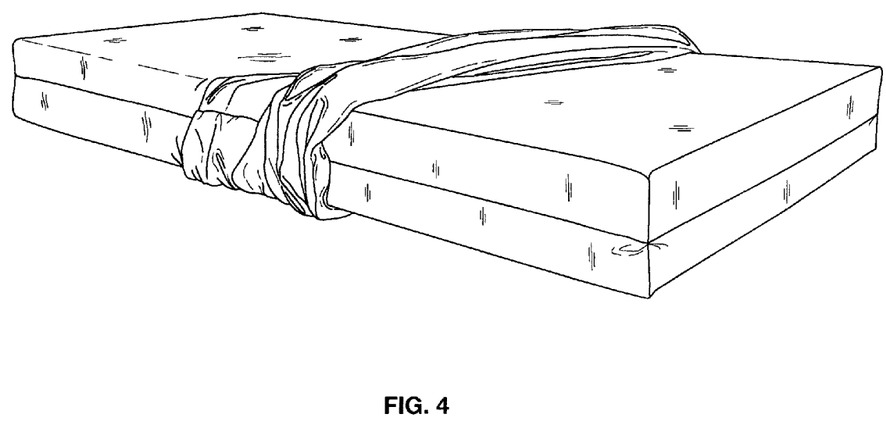
FIG. 4 shows a mattress fire barrier cover design during installation as a retrofit on a mattress.

FIG. 1 shows a mattress fire barrier cover having faceside decorative design installed on a mattress, either during manufacture or thereafter as a retrofit cover. FIG. 2 shows another embodiment of a mattress fire barrier cover design installed on core of mattress. Similarly to FIG. 1, FIG. 3 shows another mattress fire barrier cover design installed on a mattress. Similarly to FIG. 2, FIG. 4 shows a mattress fire barrier cover design during installation as a retrofit on a mattress.

One aspect of the present invention relates to its use to render mattresses and mattress sets resistant to open flame ignition sources, and to fire barrier fabrics that at least partly enclose these mattresses and/or foundations thereof. In the context of the present invention, terms relating to mattresses are defined in conformity with terms as defined by 16 C.F.R. 1632, and as follows:

"(a) Mattress means a ticking filled with a resilient material used alone or in combination with other products intended or promoted for sleeping upon.

(1) This definition includes, but is not limited to, adult mattresses, youth mattresses, crib mattresses including portable crib mattresses, bunk bed mattresses, futons, water beds and air mattresses which contain upholstery material between the ticking and the mattress core, and any detachable mattresses used in any item of upholstered furniture such as convertible sofa bed mattresses, corner group mattresses, day bed mattresses, roll-a-way bed mattresses, high risers, and trundle bed mattresses. See Sec. 1632.8 Glossary of terms, for definitions of these items.

(2) This definition excludes sleeping bags, pillows, mattress foundations, liquid and gaseous filled tickings such as water beds and air mattresses which do not contain upholstery material between the ticking and the mattress core, upholstered furniture which does not contain a detachable mattress such as chaise lounges, drop-arm love seats, press-back lounges, push-back sofas, sleep lounges, sofa beds (including jackknife sofa beds), sofa lounges (including glide-outs), studio couches and studio divans (including twin studio divans and studio beds), and juvenile product pads such as car bed pads, carriage pads, basket pads, infant carrier and lounge pads, dressing table pads, stroller pads, crib bumpers, and playpen pads. See Sec. 1632.8 Glossary of terms, for definitions of these items.

(b) Mattress Pad means a thin, flat mat or cushion, and/or ticking filled with resilient material for use on top of a mattress. This definition includes, but is not limited to, absorbent mattress pads, flat decubitus pads, and convoluted foam pads which are totally enclosed in ticking. This definition excludes convoluted foam pads which are not totally encased in ticking.

(c) Ticking means the outermost layer of fabric or related material that encloses the core and upholstery materials of a mattress or mattress pad. A mattress ticking may consist of several layers of fabric or related materials quilted together.

(d) Core means the main support system that may be present in a mattress, such as springs, foam, hair block, water bladder, air bladder, or resilient filling.

(e) Upholstery material means all material, either loose or attached, between the mattress or mattress pad ticking and the core of a mattress, if a core is present.

(f) Tape edge (edge) means the seam or border edge of a mattress or mattress pad.

(g) Quilted means stitched with thread or by fusion through the ticking and one or more layers of upholstery material.

(h) Tufted means buttoned or laced through the ticking and upholstery material and/or core, or having the ticking and upholstery material and/or core drawn together at intervals by any other method which produces a series of depressions on the surface." (16CFR1632.2)

"(r) Mattress foundation. Consists of any surface such as foam, box springs or other, upon which a mattress is placed to lend it support for use in sleeping upon." (16CFR1632.8)

Additionally, in the context of the present invention, these terms are further defined in conformity with terms as defined in the NPR on Mattress Flammability of 16 CFR 1633 as published by the CPSC in the Federal Register on Jan. 13, 2005.

In the event that any of these terms are conflicting in whole or in part, the broadest definition is intended to be used for the purposes of this application for the present invention.

A second aspect of the present invention relates to it use to render articles of upholstered furniture resistant to open flame ignition sources, and to fire barrier fabrics that at least partly enclose these upholstered furniture articles thereof. In the context of the present invention, terms relating to upholstered furniture are defined in conformity with terms as defined by the draft language of 16 C.F.R. 1634, as published by the CPSC in May 2005, and incorporated in their entirety herein by reference.

A third aspect of the present invention relates to its use to render articles filled with resilient cushioning materials resistant to open flame ignition sources, and to fire barrier fabrics that at least partly enclose these filled articles thereof. In the context of the present invention, terms relating to filled articles and bedding are defined as follows in conformity with the terms defined by the California BHFTI draft of Technical Bulletin #604 published Oct. 1, 2004, and the ANPR for 16 CFR 1634 Standard To Address Open Flame Ignition of Bedclothes published by the CPSC in the Federal Register on Jan. 13, 2005, pages 2514 through 2517, and incorporated in their entirety herein by reference.

FIG. 1 is a view of one proposed embodiment of the cover described in the present invention.

FIG. 2 shows another embodiment of the invention, an existing mattress that does not meet a full scale open flame resistant standard that has been encased in the retrofit cover Resistance of the encased mattress to ignition after exposure to an open flame may be determined by full-scale testing in accordance with NFPA 267, 2003 edition, ASTM E 1590, TB 129, TB 603 or the proposed standard 16 CFR 1633. Test protocols of each of these standards are widely available and the entire contents of each test method are incorporated herein by reference. Results of testing a mattress according to the present invention according to such test protocols typically show a maximum heat release rate of less than 250 kW and a total energy release of less than 40 MJ in the first five minutes of each test. In some embodiments of the invention, even better results may be obtained, as follows: maximum heat release rate of less than 100 kW, total heat release of less that 25 MJ in the first ten minutes of the test and weight loss due to combustion of less than 3 pounds in the first ten minutes of the test.

FIG. 3 shows another embodiment of the invention, which, while being illustrated as a mattress is also applicable to an existing article of upholstered furniture that does not meet a full scale open flame resistant standard that has been encased in the retrofit cover. Resistance of the encased article of upholstered furniture to ignition after exposure to an open flame may be determined by full-scale testing in accordance with California Technical Bulletin 133, TB117, ASTM E-1537, NFPA 266 or the methods outlined in the CPSC Staff Draft Standard for Upholstered Furniture Flammability (May 2005), to assess performance of full-scale composite furniture items and mock-ups against open flame ignition sources. Test protocols of each of these standards are widely available and the entire contents of each test method are incorporated herein by reference. Results of testing an upholstered furniture article according to the present invention according to such test protocols typically show a maximum heat release rate of less than 250 kW and a total energy release of less than 40 MJ in the first five minutes of each test. In some embodiments of the invention, even better results may be obtained, as follows: maximum heat release rate of less than 100 kW, total heat release of less that 25 MJ in the first ten minutes of the test and weight loss due to combustion of less than 3 pounds in the first ten minutes of the test.

FIG. 4 shows another embodiment of the invention, which, while being illustrated as a mattress is also applicable to an existing article of a filled bedding article that does not meet a full scale open flame resistant standard that has been encased in the retrofit cover. Resistance of the encased filled bedding article to ignition after exposure to an open flame may be determined by full-scale testing in accordance with California Technical Bulletin 604 (Draft) or the ANPR for a Standard to Address Open Flame Ignition of bedclothes (16 CFR 1634), to assess performance of full-scale composite furniture items and mock-ups against open flame ignition sources. Test protocols of each of these standards are publicly available and the entire contents of each test method are incorporated herein by reference. Results of testing a filled bedding article according to the present invention according to such test protocols would result in a passing result under the appropriate section, determined by the nature of the filled bedding article, of the TB604 draft.

The fire barrier fabric according to the present invention is set forth in the parent application, which is incorporated herein by reference in its entirety. One preferred embodiment is a double knitted jersey fabric with a filling material, further having a decorative face side. The outside face of the fabric is comprised of non-FR enhanced (standard) yarns comprised of standard materials, the middle filling material component is comprised of textured polyester yarns or other similar textured yarns and the inside layer is comprised of yarns comprised of inherently flame retardant materials and fibers that create the fire barrier element to the fabric. Alternative embodiments could replace the inside layer materials with standard materials and relocate the filling material yarns serving as the middle layer with textured yarns comprised of inherently flame retardant materials or fibers. Further alternative embodiments could be to create a double jersey knit without filling material, locating the yarns of inherently flame retardant materials or fibers to the inside face—the outside face being the side of the fabric to which texture or design could be rendered to enhance the aesthetic appeal of the fabric.

The yarns used to create the fire barrier element of the fabric used to comprise the retrofit cover can be selected from all available yarn formation techniques and are not limited in size or formation. Yarns may be plied, plated, corespun, textured, twisted, air-entangled, spun (ring, air-jet, etc.), flat, or any suitable yarn types for this application.

The fire barrier element is composed of at least one char-forming, inherently flame-retardant fiber.

A retrofit cover according to the present invention is functional for installation by a consumer, i.e., applied to a completely manufactured product following commercial release, includes a fire barrier fabric that is unitary and integrally formed and including a fire barrier that functions to protect a mattress and/or mattress foundation from fire by forming a char when exposed to an ignition source. In the context of the present invention, the term 'char' is defined as a residue formed from material that has been exposed to heat and/or flame, and which is no longer flammable. The char may be formed from materials that have been incompletely burned and extinguished, or from materials that do not react chemically under conditions found in a fire, and so, are not flammable, such as fiberglass. The char may also possess mechanical strength and integrity and so can act as a physical barrier to prevent flames from contacting highly combustible interior fill components of mattresses and mattress foundations. In addition, it is desirable that the char should not melt, drip or shrink away from the ignition source, or display significant after-flame, or support these reactions at a level sufficient to cause ignition of adjacent materials.

The potential benefits that accrue from such a retrofit cover are not necessarily limited only to the installed base of products manufactured prior to the effective date of a regulatory standard governing composite product flammability and that were not originally manufactured to be open-flame resistant. Embodiments of traditional fire blocking technologies have used topically applied flame retardant treatments. Durability tests on the long-term protective capabilities of these treatments have raised the specter that such treatments may degrade, and possibly disappear, in their performance over time. Such product degradation and subsequent inability of composite items to meet minimum established levels of FR performance, might necessitate voluntary or even mandatory recall of such products. The cost to the manufacturer of re-manufacturing such recalled items might well be economically crushing. A preferred approach, and one used routinely in product safety recalls, if for the manufacturer to send a "repair kit" to the consumer for them to install—the retrofit nature of the present invention would be suitable for such a circumstance.

Additionally, were the retrofit cover design fabricated in such a manner as to facilitate both consumer installation and removal, such a cover might also be able to be laundered. In the event that laundering of the cover was found to be a desirable consumer benefit, the selection of fibers for the fire barrier element would have to be made with ample understanding that the performance of the fire barrier would have to survive any reasonable laundering measures without compromising the protective nature of the cover or causing its performance capabilities to degrade. As such, it is unlikely that many topically applied chemical flame-retardant treatments would be suitable for use in the fire barrier fabric element were the laundering component of the design to be employed.

Accordingly, the fire barrier fabric element of the retrofit cover includes at least one char-forming flame-retardant fiber incorporated in the fabric. The fire barrier fabric element of the retrofit cover preferably includes the same fiber or different fibers. Any char-forming flame retardant fiber may be used for the fire barrier fabric element of the retrofit cover, and the following fibers have been found to be particularly useful: aramids, including para-aramids (poly(p-phenylene terephthalamide), e.g., KEVLAR® (Dupont Corporation) and TWARON® (Teijin Twaron BV) and meta-aramids (poly(m-phenylene isophthalamide),such as Nomex® (Dupont Corporation) and Conex® (Teijin Twaron BV); fiberglass; melamines such as BASOFIL® (BASF/Mckinnon-Land-Moran, LLC); poly-benzimidazole (PBI) (Celanese Acetate A.G); oxidized polyacrylonitrile (PAN); novoloids, such as KYNOL® (American Kynol, Inc); pre-oxidized fibers and carbon fibers, modacrylics, such as, e.g., KANECERON® and PROTEX® (Kaneka), SEF (Solutia) and LUFNEN® (Kanebo Goshen), FR (fire- or flame-resisting, -resistant, -retarding or -retardant) rayon, FR viscose, such as, e.g., VISIL® (Sateri Oy) and LENZING FR® (Lenzing AG, Fibers Division), wool and FR-treated cotton. It should be noted that these fibers are merely exemplary and not exhaustive, and other fire-retardant fibers that form a char, including fibers that are developed in the future may be used. Additionally, certain proprietary modacrylic fibers that release extinguishing/oxygen depriving elements, such as antimony, when exposed to an ignition source may be used. This chemical reaction assists in snuffing out small flames that may occur on adjacent, non-FR components such as the mattress covering fabric or ticking, but is not required for the primary FR properties of the cover or the covered or partially covered mattress or other article. Blends that include at least one fire-retardant fiber that form a char may also be used. The blends may include one or more structure-providing char-forming fire-retardant fibers, FR-treated fibers, such as FR-treated polyester, and non-FR fibers. For example, in one embodiment, the fire barrier layer is composed of a blend of aramid and modacrylic fibers and the thermally insulating layer is composed of a blend of FR viscose and modacrylic fibers. Aramid-modacrylic blends typically contain 5-25% para-aramid fiber and 75-95% modacrylic fiber, and flame-retardant viscose-modacrylic blends, 50-75% FR Viscose and 25-50% modacrylic fibers. Non-flame-resistant polyester is typically used as a carrier fiber for manufacturing fiberglass fabrics, and these fabrics may contain 10% of a polyester fiber, and up to 50% of that fiber.

Flame retardant fibers that form a char and provide structure to that char include high temperature fibers such as the aramids, fiberglass, melamines, PBI, oxidized PAN, novoloids, pre-oxidized fibers and carbon fibers. These are capable of forming a char having mechanical integrity that can remain in place to protect adjacent materials from the ignition source, and provide a structural support for char or other residue formed from other fibers blended with or otherwise combined therewith.

In some embodiments, the fire barrier element may be composed of either high temperature fibers that are inherently flame and heat resistant and promote char formation and char integrity or fibers that simply promote char formation.

The long-term durability of the fire barrier fabric used to form the retrofit cover may be evaluated as measured by Rollator (ASTM F1566) testing. The unitary and integrally formed fabric is more durable and less likely to delaminate as compared to stratified or layered fabrics that are stitched or otherwise attached to each following fabric layer formation.

Specific design parameters, such as weight of the finished fabric, weight of the fire barrier element and of the standard materials, blend levels of fibers for each of the components, yarn size, yarn construction and choice of textile construction, are not critical. Weight of effective fire barrier fabrics typically ranges between 0.25 oz and 25 oz per square yard, depending on the severity of the test to which performance is being judged and the protective challenge required for different mattress, furniture or filled article constructions are based on the fuel load they represent, a range of configurations and combinations of elements that make up fire barrier fabrics.

It is not necessary that fire barrier fabrics according to the present invention be finished, that is bleached, dyed, scoured, heat-set, pre-shrunk, as these steps typically add cost to the finished product without any additional aesthetic benefit, as the fabric is typically concealed from view. Therefore, the greige state of the fabric is typically sufficient. However, if finishing were desired, such would not materially affect performance of the fabric. Hand of the fire barrier fabric typically does not compromise comfort elements of the sleep surface. Mattress manufacturers may employ objective measures of this using a process referred to as pressure mapping.

A typical design approach for residential mattresses is to localize comfort elements, such as polyurethane foams and battings, in the sleep surface areas (panels), with a minimum of fabric in the borders or sides. Accordingly, the fire barrier fabric according to the present invention at least partially encloses the core of the mattress, and the core may be fully enclosed, if desired, as flame retardant performance may be achieved without loft or thickness being so high as to hinder the ability of the mattress manufacturer to completely encapsulate the fuel load with the fire barrier fabric. Fire barrier fabric having different compositions, typically varying according to weight of the fire barrier layer or the thermally insulating layer, may be used to cover different areas of the mattress or mattress foundation. The cover contemplated by the present invention joins individual pieces of fire barrier fabric or creates seams with sewing thread specifically designed to withstand ignition, typically para-aramid or fiberglass sewing thread.

The fire barrier fabric used to create the retrofit cover contemplated by the present invention must be designed to address variable flammability of decorative exterior cover that are not removed by the end-user/consumers during installation, not just the filling materials that are protective by conventional approaches to barrier design

EXAMPLES

Example 1

Fabric Manufacture

Several versions of the fabric to construct the retrofit cover were manufactured.

Compositions of the fire barrier fabrics manufactured are listed in Table 1.

| Ex. no. | Fabric type | Weight, oz/yd | Fabric Composition |
|---|---|---|---|
| 1.1 | Double Knit | | Outside - Cotton<br>Middle - Textured Polyester<br>Inside (FB) -<br>Kevlar ® Protex ® Modacrylic Blend |
| 1.2 | Double Knit | | Outside - Cotton<br>Middle - Textured Polyester<br>Inside (FB) -<br>Fiberglass Protex ® Modacrylic Polyester Blend |
| 1.3 | Double Knit | | Outside - Cotton<br>Middle - Textured Polyester<br>Inside (FB) -<br>Fiberglass VISIL ® Polyester Blend |
| 1.4 | Double Knit | | Outside - Cotton<br>Middle - Textured Polyester<br>Inside (FB) -<br>Corespun Fiberglass with Protex ® Modacrylic Wrapper |

KEVLAR ® is a para-aramid fiber available from DuPont
PROTEX ® is a modacrylic fiber obtained from Kaneka Corporation
VISIL ® is a FR-viscose fiber obtained from Sateri OY, Valkeakoski Finland

Example 2

Full-Scale Open Flame Testing

Procedure

Two prototype products were created for evaluating the present invention.

In the first prototype, a mattress core measuring 72"×36"×6" comprised of visco-elastic and polyurethane foam material was selected to build a mattress.

Example No. 1.4 of the fabric embodiments recited above was selected to serve as the outer ticking of the first prototype. The fabric was left in its tubular form and greige state. No finishing or treatment was applied to the fabric.

Using conventional design techniques a cover that fully encased the selected core was fashioned. All seams were closed using Kevlar® sewing thread of size Tex 50 as manufactured by Saunders Thread Company. The cover was installed over the core prior to final closing of the seams and once installed the final seams were closed with the Kevlar thread. This prototype is indicative of the use of the fabric as a mattress ticking at the point of original manufacture.

In the second prototype, a mattress core measuring 70"×33"×6" comprised of polyurethane foam was selected to build a mattress.

The mattress core was covered with a blue damask ticking and the seams sewn with standard threads. In this form the mattress as fashioned represents a mattress representative of the style and performance profile of the mattresses manufactured and sold prior to the requirement for enhanced levels of open-flame resistant performance.

A retrofit cover designed to be removably attachable was fabricated using the fabric embodiment recited in Example No. 1.4 above. Conventional design techniques were used to make a cover that fully encased the selected core. All seams were closed using Kevlar® sewing thread of size Tex 50 as manufactured by Saunders Thread Company. The cover was installed over the finished mattress prior to final closing of the seams and once installed the final seams of the retrofit were closed with the Kevlar thread. An alternative embodiment to closing the retrofit cover with a sewn seam would be to use a zipper to facilitate consumer installation and removal.

The mattress with retrofit cover was tested in accordance with California Technical Bulletin 603, Option C Room Configuration. All instrumentation was zeroed, and calibrated prior to testing. The test specimen, after conditioning for 48 hours at 70° F.+/−5° F. and no more than 55% Relative Humidity, was placed on a metal test frame. The test was conducted according to the test protocol of TB603 which is hereby incorporated herein in its entirety by reference.

Data recorded included: room smoke opacity; weight loss; smoke release rate (SRR); total smoke release (TSR); carbon monoxide concentration; heat release rate (HRR); total heat release (THR); ceiling temperature above specimen; and temperature at 4 feet above floor, 3 feet out from center of specimen

TABLE 2

TB 603 Test Results - Full-scale Mattress

| Example No. | Description of Specimen ||||| Comments |
|---|---|---|---|---|---|---|
| | Fire Barrier | Mattress Core Type | Foundation? | Ticking Material | Results | |
| 2.1 | Double Knit with filling material No 1.4 | Vicso elastic polyurethane foam core | No | Double Knit with filling material No 1.4 | Pass<br>Ceiling Temp Max - 161 F.<br>Peak Heat Release - 21 kW<br>Total Heat Release (1st 10 Min) - 3.5 MJ | Mattress "Originally Manufactured" to be open flame resistant |
| 2.2 ... | Double Knit with filling material No | Polyurethane foam core | No | Blue Damask | Pass<br>Ceiling Temp Max - 183 F. | Retrofit cover |

TABLE 2-continued

TB 603 Test Results - Full-scale Mattress

| Example No. | Description of Specimen | | | | Results | Comments |
|---|---|---|---|---|---|---|
| | Fire Barrier | Mattress Core Type | Foundation? | Ticking Material | | |
| | 1.4 | | | | Peak Heat Release - 23 kW Total Heat Release (1$^{st}$ 10 Min) - 2.0 MJ | |

A fire barrier fabric according to the present invention may also be used in other applications where it is desired to protect an upholstered or otherwise padded or filled composite article from heat of flames. Examples of applications include upholstered furniture and transportation and health care seating systems, where filling materials may be partly or completely enclosed by a fire barrier fabric according to the invention. Transportation seating systems include seats for airplanes, trains and buses and health care seating systems include seats or cushions for wheelchairs. Another example is protective apparel, such as firefighter turnout gear, where the filling materials may be covered by a fire barrier fabric. Performance of the flammability resistance of such articles may be evaluated using the protocols set forth in full-scale fire tests such as those already recited herein.

Certain modifications and improvements will occur to those skilled in the art upon a reading of the foregoing description. By way of example, the cover of the present invention may be applied to filled bedding articles during their manufacture and/or assembly. All modifications and improvements have been deleted herein for the sake of conciseness and readability but are properly within the scope of the following claims.

What is claimed is:

1. A flame resistant mattress comprising:
a mattress not originally manufactured to meet a full-scale open flame resistant fire standard;
a cover for at least partially enclosing the mattress, the cover comprising a unitary, integrally formed fabric having a fire barrier element comprised of char-forming, inherently flame retardant fibers;
wherein the fabric further comprises a unitary, integrally formed multilayer knitted fabric, made from a knitting process, having at least two layers, including a knitted outside layer and a knitted fire barrier layer, the multilayer knitted fabric being unitary and integrally formed, such that the outside layer is knitted together with the fire barrier layer during the knitting process such that the multilayer knitted fabric does not require additional stitching to maintain structural integrity; wherein the fire barrier layer provides flame-retardant and/or flame-resistant properties to the entire fabric without requiring fabric coatings or treatments to provide any contribution to flame retardance or resistance; and
wherein the cover is removably attachable to the mattress, and wherein the mattress, when at least partially covered by the cover is rendered open flame resistant to a full scale fire test, thereby providing a flame resistance and/or flame retardance.

2. A mattress according to claim 1, wherein said mattress, when tested in accordance with 16 CFR 1633 as of Aug. 22, 2005, has a maximum heat release rate of less than 200 kW and a total energy release of less than 25 MJ in the first five minutes of the test.

3. A mattress according to claim 1, wherein said mattress, when tested in accordance with TB 603 as of Aug. 22, 2005, has a maximum heat release rate of less than 200 kW and a total energy release of less than 25 MJ in the first five minutes of the test.

4. A mattress according to claim 1, wherein said mattress, when tested in accordance with ASTM E 1590 as of Aug. 22, 2005, has a maximum heat release rate of less than 250 kW and a total energy release of less than 40 MJ in the first five minutes of the test.

5. A mattress according to claim 1, wherein said cover comprising a knitted fabric with fire barrier element is comprised of a double knitted fabric with filling material.

6. The mattress of claim 1, wherein the cover includes a decorative face side.

7. A mattress according to claim 1, wherein said cover comprises a double knitted fabric integrally formed with a filling material and the fire barrier element that is comprised of char-forming, inherently flame retardant fibers.

8. A mattress according to claim 7, wherein said char-forming, inherently flame retardant fibers is para-aramid fibers, meta-aramid fibers, fiberglass, melamine fibers, polybenzimidazole fibers, polyacrylonitrile fibers, novoloid fibers, pre-oxidized fibers, carbon fibers, modacrylic fibers, flame-resistant rayon fibers, flame-retardant viscose fibers, wool fibers, and flame-retardant treated cotton fibers.

9. A mattress according to claim 1, wherein said fire barrier fabric is a double knitted fabric.

10. A mattress according to claim 1, wherein said cover comprising a double knitted fabric unitarily and integrally formed with the fire barrier element is comprised of char-forming, inherently flame retardant fibers.

11. A mattress according to claim 10, wherein said char-forming, inherently flame retardant fibers-para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, or flame-retardant treated cotton fibers.

12. A mattress according to claim 1, wherein said retrofit cover comprised of a knitted fabric with fire barrier element, is joined at the seams using fire resistant sewing threads.

13. A mattress according to claim 12, wherein said fire resistant thread is para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, or flame-retardant treated cotton fibers.

14. A mattress according to claim 7, wherein said char-forming, inherently flame retardant fibers is a material selected from the group consisting of para-aramid fibers, modacrylic fibers, flame-retardant viscose fibers, fiberglass and blends thereof.

15. A mattress according to claim 7, wherein said char-forming, inherently flame-retardant fibers comprises a para-aramid fiber.

16. A mattress according to claim 7, wherein said char-forming, inherently flame retardant fibers comprises a blend of para-aramid and modacrylic fibers.

17. A mattress according to claim 7, wherein said char-forming, inherently flame retardant fibers comprises a blend of para-aramid and flame-retardant viscose fibers.

18. A mattress according to claim 7, wherein said char-forming, inherently flame retardant fibers comprises fiberglass.

19. An open flame resistant mattress set comprising: a mattress according to claim 1, and a mattress foundation; neither originally manufactured to meet a full-scale open flame resistant fire standard;
wherein the mattress foundation comprises a foundation cover for at least partially enclosing the mattress foundation, the foundation cover comprising a unitary, integrally formed fabric having a fire barrier element comprised of a char-forming, inherently flame retardant fibers;
wherein the fabric further comprises a unitary, integrally formed multilayer knitted fabric, made from a knitting process, having at least two layers, including a knitted outside layer and a knitted fire barrier layer, the multilayer knitted fabric being unitary and integrally formed, such that the outside layer is knitted together with the fire barrier layer during the knitting process such that the multilayer knitted fabric does not require additional stitching to maintain structural integrity; wherein the fire barrier layer provides flame-retardant and/or flame-resistant properties to the entire fabric without requiring fabric coatings or treatments to provide any contribution to flame retardance or resistance; and
wherein the foundation cover is removably attachable to the mattress foundation, and wherein the mattress foundation, when at least partially covered by the foundation cover is rendered open flame resistant to a full scale fire test, thereby providing a flame resistance and/or flame retardance;
wherein both the mattress and the mattress foundation are rendered as a set to be open flame resistant to a full scale fire test by the installation of the cover and the foundation cover.

20. A mattress set according to claim 19, wherein said mattress, when tested in accordance with 16 CFR 1633 as of Aug. 22, 2005, has a maximum heat release rate of less than 200 kW and a total energy release of less than 25 MJ in the first five minutes of the test.

21. A mattress set according to claim 19, wherein said mattress, when tested in accordance with TB 603 as of Aug. 22, 2005, has a maximum heat release rate of less than 200 kW and a total energy release of less than 25 MJ in the first five minutes of the test.

22. A mattress set according to claim 19, wherein said mattress, when tested in accordance with ASTM E 1590 as of Aug. 22, 2005, has a maximum heat release rate of less than 250 kW and a total energy release of less than 40 MJ in the first five minutes of the test.

23. A mattress set according to claim 19, wherein said cover comprising a knitted fabric with fire barrier element is comprised of a double knitted fabric with filling material.

24. A mattress set according to claim 19, wherein said cover comprising a double knitted fabric with filling material and fire barrier element is comprised of char-forming, inherently flame retardant.

25. A mattress set according to claim 24, wherein said char-forming, inherently flame retardant fibers is para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, or flame-retardant treated cotton fibers.

26. A mattress set according to claim 19, wherein said fire barrier fabric is comprised of a double knitted fabric.

27. A mattress set according to claim 19, wherein said cover comprising a double knitted fabric with fire barrier element is comprised of inherently flame retardant, char forming yarns or fibers.

28. A mattress set according to claim 27, wherein said char-forming, inherently flame retardant fibers is para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, or flame-retardant treated cotton fibers.

29. A mattress set according to claim 19, wherein said cover comprised of a knitted fabric with fire barrier element, is joined at the seams using fire resistant sewing threads.

30. A mattress set according to claim 29, wherein said fire resistant thread is para-aramid fibers, meta-aramid fibers, fiberglass, melamine fibers, poly-benzimidazole fibers, polyacrylonitrile fibers, novoloid fibers, pre-oxidized fibers, carbon fibers, modacrylic fibers, flame-resistant rayon fibers, flame-retardant viscose fibers, wool fibers, or flame-retardant treated cotton fibers.

31. A mattress set according to claim 29, wherein said char forming, inherently flame retardant fibers is a material selected from the group consisting of para-aramid fibers, modacrylic fibers, flame-retardant viscose fibers, fiberglass and blends thereof.

32. A mattress set according to claim 24, wherein said char-forming, inherently flame-retardant fibers comprises a para-aramid fiber.

33. A mattress set according to claim 24, wherein said char-forming, inherently flame retardant fibers comprises a blend of para-aramid and modacrylic fibers.

34. A mattress set according to claim 24, wherein said char-forming, inherently flame retardant fibers comprises a blend of para-aramid and flame-retardant viscose fibers.

35. A mattress set according to claim 24, wherein said char-forming, inherently flame-retardant fibers comprises fiberglass.

36. The mattress set of claim 19, wherein the cover includes a decorative face side.

37. A flame resistant mattress comprising:
a mattress having at least partial flame resistance;
a cover for at least partially enclosing the mattress, the cover comprising a unitary, integrally formed fabric having a fire barrier element comprised of char-forming, inherently flame retardant fibers;
wherein the fabric further comprises a unitary, integrally formed multilayer knitted fabric, made from a knitting process, having at least two layers, including a knitted outside layer and a knitted fire barrier layer, the multilayer knitted fabric being unitary and integrally formed, such that the outside layer is knitted together with the fire barrier layer during the knitting process such that the multilayer knitted fabric does not require additional stitching to maintain structural integrity; wherein the fire barrier layer provides flame-retardant and/or flame-resistant properties to the entire fabric without requiring fabric coatings or treatments to provide any contribution to flame retardance or resistance; and wherein the cover is removably attachable to the mattress, and wherein the mattress, when at least partially covered by the cover is rendered open flame resistant to a full scale fire test, thereby providing a flame resistance and/or flame retardance.

38. A flame resistant mattress comprising:

a fire barrier fabric further comprising a unitary, integrally formed multilayer knitted fabric, made from a knitting process, having at least two layers, including a knitted outside layer and a knitted fire barrier layer, the multilayer knitted fabric being unitary and integrally formed, such that the outside layer is knitted together with the fire barrier layer during the knitting process such that the multilayer knitted fabric does not require additional stitching to maintain structural integrity; wherein the fire barrier layer provides flame-retardant and/or flame-resistant properties to the entire fabric without requiring fabric coatings or treatments to provide any contribution to flame retardance or resistance; and a mattress core that is at least partially enclosed by the fabric;

wherein the fire barrier layer comprises char-forming, inherently flame retardant fibers;

wherein the mattress is rendered open flame resistant to a full scale fire test, Thereby providing a flame resistance and/or flame retardance.

* * * * *